(12) United States Patent
Sagar et al.

(10) Patent No.: US 6,866,498 B2
(45) Date of Patent: Mar. 15, 2005

(54) EXTRUSION DIE WITH SUPPLY GROOVE TRANSFER

(75) Inventors: Surendra M. Sagar, Mississauga (CA); Mirek Planeta, Mississauga (CA)

(73) Assignee: Macro Engineering & Technology Inc., Mississauga (*) Notice: Subject to any disclaimer, the term of this patent is extended or adjusted under 35 U.S.C. 154(b) by 251 days.

(21) Appl. No.: 10/209,891

(22) Filed: Aug. 2, 2002

(65) Prior Publication Data

US 2004/0022886 A1 Feb. 5, 2004

(51) Int. Cl.[7] .............................................. B29C 47/20
(52) U.S. Cl. ........................ 425/380; 425/462; 425/467
(58) Field of Search .............................. 425/462, 380, 425/467

(56) References Cited

U.S. PATENT DOCUMENTS 5,393,216 A * 2/1995 Teutsch et al. .......... 425/133.1
5,651,935 A * 7/1997 Matsukura et al. ......... 264/503
5,716,650 A * 2/1998 Mavridis .................. 425/131.1

* cited by examiner

Primary Examiner—Joseph S Del Sole

(57) ABSTRACT

An extrusion die for extruding plastic material as a tubular film has mututally engaging first and second body members which form an annular extrusion orifice therebetween. One of the body members has main feed grooves in a surface thereof adjacent the other body member and extending in a spiral manner relative to the annular extrusion orifice, and one of the body members has supply grooves in a surface thereof adjacent the other body member for receiving plastic material from one or more extruders. Each supply groove has an end portion adjacent but spaced from an initial portion of a main feed groove, whereby plastic material from the extruder or extruders is received by the supply grooves and forced from the end portions thereof along a passage between the body members and into the initial portions of the spiral feed grooves.

14 Claims, 15 Drawing Sheets

EXTRUSION DIE WITH SUPPLY GROOVE TRANSFER

FIELD OF INVENTION

This invention relates to extrusion dies for extruding plastic material as a tubular film.

BACKGROUND OF INVENTION

A common type of extrusion die for extruding plastic material as a tubular film has first and second body members which form an annular extrusion orifice. The plastic material is fed to the die from one or more extruders and passes into one or more spiral grooves in a surface of one of the body members adjacent the other body member. To obtain good quality film, the plastic material extruded should be as homogenous as possible and at substantially the same temperature throughout. U.S. Pat. No. 5,261,805 (Gates) issued Nov. 16, 1993 describes an extrusion die which overcomes these problems to some extent, but there is still a need for an improved die in this respect.

It is therefore an object of the invention to provide an extrusion die for extruding plastic material as a tubular film which provides extruded plastic material in an improved manner with respect to homogeneity and consistency of temperature.

SUMMARY OF INVENTION

According to the present invention, an extrusion die for extruding plastic material as a tubular film has mutually engaging first and second body members which forms an annular extrusion orifice therebetween. One of the body members has main feed grooves in a surface thereof adjacent the other body member and extending in a spiral manner relative to the annular extrusion orifice, and one of the body members has supply grooves in a surface thereof adjacent the other member and for receiving plastic material from one or more extruders, each supply groove having an end portion adjacent but spaced from an initial portion of a main feed groove. Plastic material from the extruder or extruders is received by the supply grooves and forced from the end portions thereof along a passage between the body members and into the initial portions of the spiral feed grooves. Thus, higher viscosity (cooler) material on the bottom of the supply grooves is mixed with lower viscosity (hotter) material on the top of the supply grooves prior to entry of the material into the main feed grooves.

It has been found that an extrusion die in accordance with the present invention produces improved homogeneous mixing and consistency of temperature, especially when the extrusion die is provided with internal bubble cooling capability which produces significant temperature differences between port holes for the hot plastic material and port holes for chilled air for cooling plastic film extruded from an annular extrusion orifice. Also, total gauge uniformity is improved when the extruder supplying the die does not provide good melt uniformity.

Each supply groove end portion may feed plastic material into a different single main feed groove. Each adjacent pair of supply grooves may receive plastic material from a different single port. Each supply groove may receive plastic material from a different single port.

Each supply groove end portion may feed plastic material into two main feed grooves. Each supply groove may receive plastic material from a single port. Each supply groove may receive plastic material from two adjacent ports. Each port may feed plastic material to two supply grooves.

Each main feed groove may receive plastic material from two supply grooves. Each supply groove end portion may feed a series of main feed grooves.

The first and second body members may be inner and outer body members, and the supply grooves may be at a lower end of the inner body member.

The second body member may be mounted above the first body member. The annular extrusion orifice may be located centrally and be surrounded by the main feed grooves. Alternatively, the annular extrusion orifice may be located radially outwardly of the main feed grooves.

DESCRIPTION OF THE DRAWINGS

Embodiments of the invention will now be described, by way of example, with reference to the accompanying drawings, of which.

DESCRIPTION OF PREFERRED EMBODIMENTS

Figure 1:
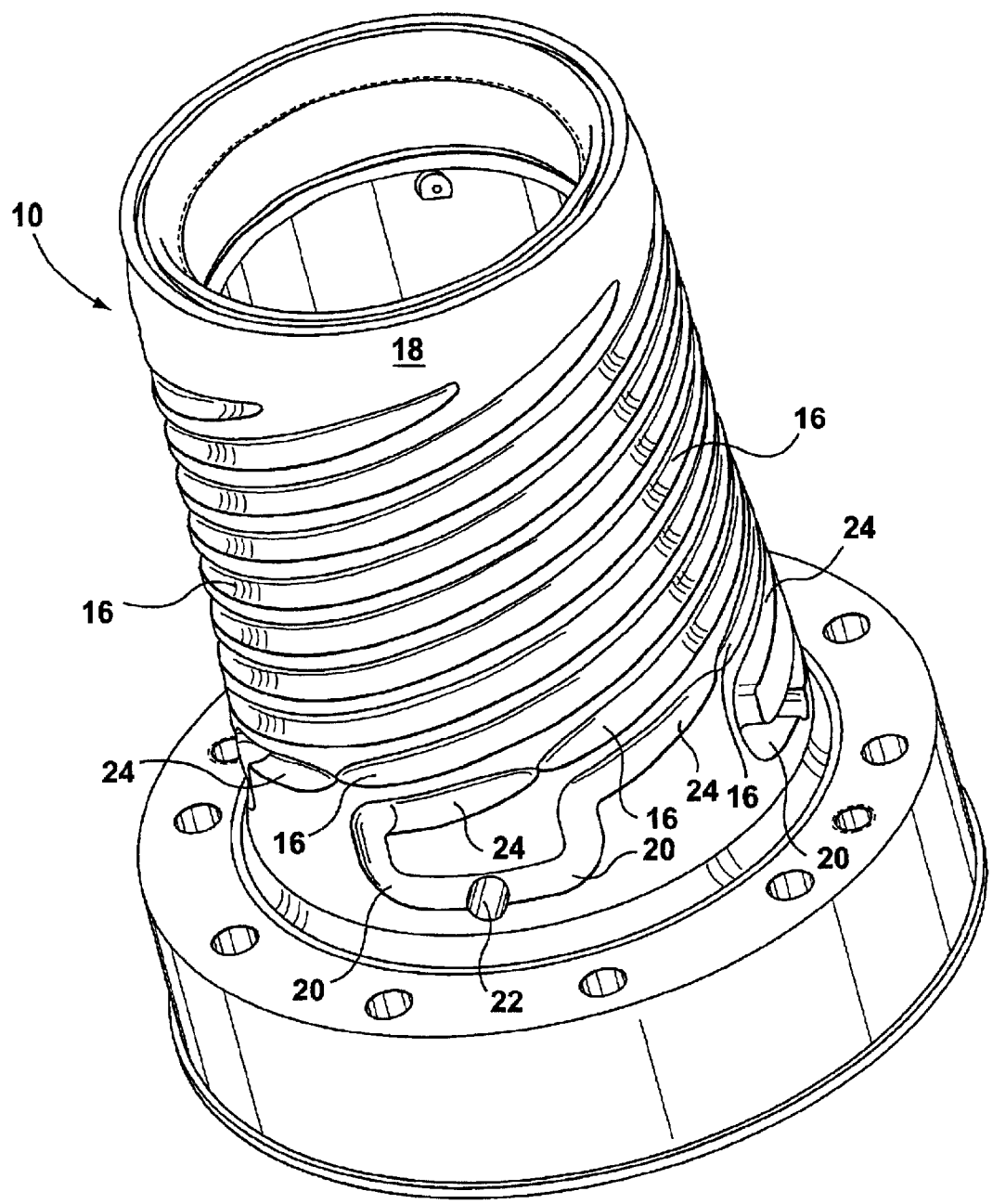
FIG. 1 is a perspective view of an inner body member of an annular extrusion die in accordance with one embodiment of the invention.
Figure 2:
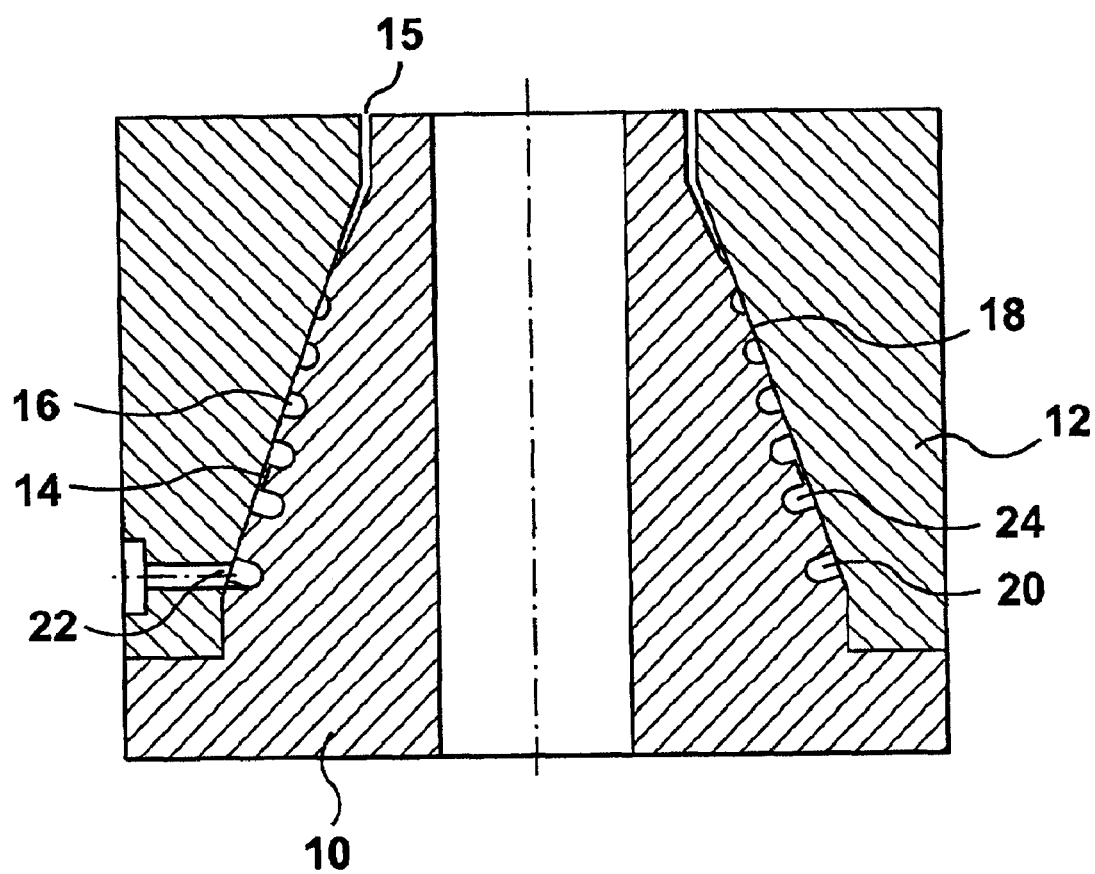
FIG. 2 is a sectional view of the extrusion die showing the outer body member as well as the inner body member.
Figure 3:
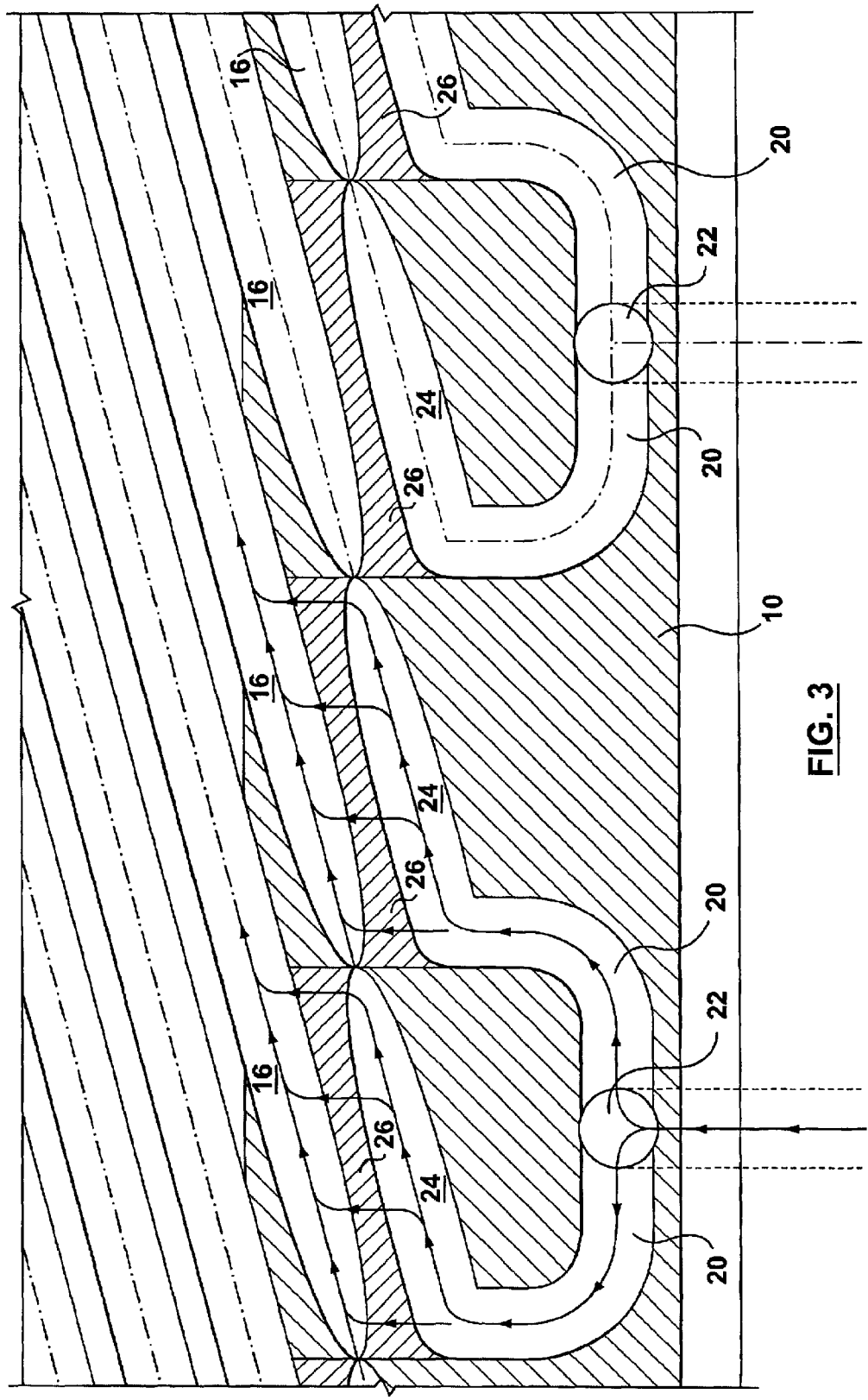
FIG. 3 is a diagrammatic view of some of the supply grooves and main feed grooves in the inner body member.

Referring first to FIGS. 1 to 3 of the accompanying drawings, an extrusion die for extruding plastic material as a tubular film has mutually engaging inner and outer body members 10, 12 which form an annular extrusion orifice 15 therebetween. The inner body member 12 has a series of spiral main feed grooves 16 in its outer surface 18 adjacent the outer body member 12, the main feed grooves 16 thus extending in a spiral manner relative to the annular extrusion orifice 15.

The inner body member 10 also has supply grooves 20 in its outer surface 18 which receives plastic material from one or more extruders (not shown) through circumferentially spaced ports 22. Each supply groove 20 has an end portion 24 adjacent but spaced from an initial portion of a main feed groove 16. The ports 22 may be in the inner body member 10 as indicated in FIG. 1 if the extrusion die is bottom fed or in the outer body member 12 as indicated in FIG. 2 if extrusion die is a side fed die. In this embodiment, two supply grooves 20 extend in opposite directions from each port 22, with their end portions 24 feeding plastic material to the initial portions of different main feed grooves 16. The left hand supply groove 20 turns through 180° to terminate in an end portion 24 adjacent but spaced from an initial portion of one main spiral feed groove 16, and the right hand supply groove 20 terminates in an end portion 24 adjacent the initial portion of another main spiral feed groove 16.

In use, plastic material from the extruder or extruders flows through each port 22 into the two associated supply grooves 20 and into their respective end portions 24. The plastic material is then forced to flow from the end portions 24 through an annular passage 14 between the inner and outer members 10, 12 to the initial portions of the respective main spiral feed grooves 16, such flow being indicated by the shaded areas 26 in FIG. 3. Such flow of plastic material from the end portions 24 of the supply grooves 20 through the annular passage 14 to initial portions of the main spiral feed grooves 16 causes the plastic material entering the initial portion 16 of the main spiral feed grooves 16 to be more thoroughly mixed and at a more consistent temperature throughout than would otherwise be the case.

Figure 4:
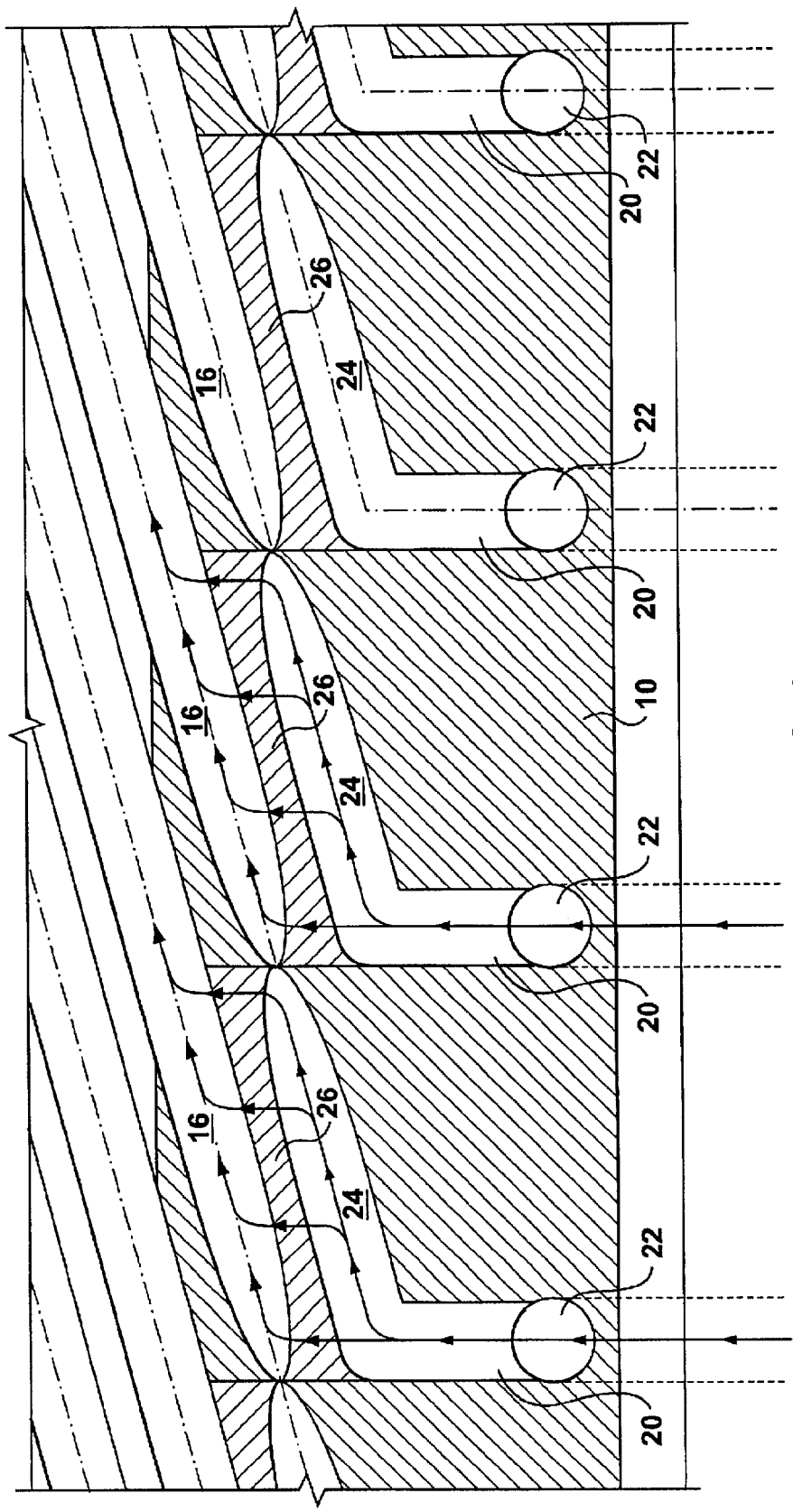
FIG. 4 is a similar view showing a further embodiment.

FIG. 4 is similar to FIG. 3 but shows another embodiment in which each port 22 supplies plastic material to only one supply passage 20, whose end portion 24 supplies plastic material to the initial portion of a respective main spiral feed passage 16.

Figure 5:
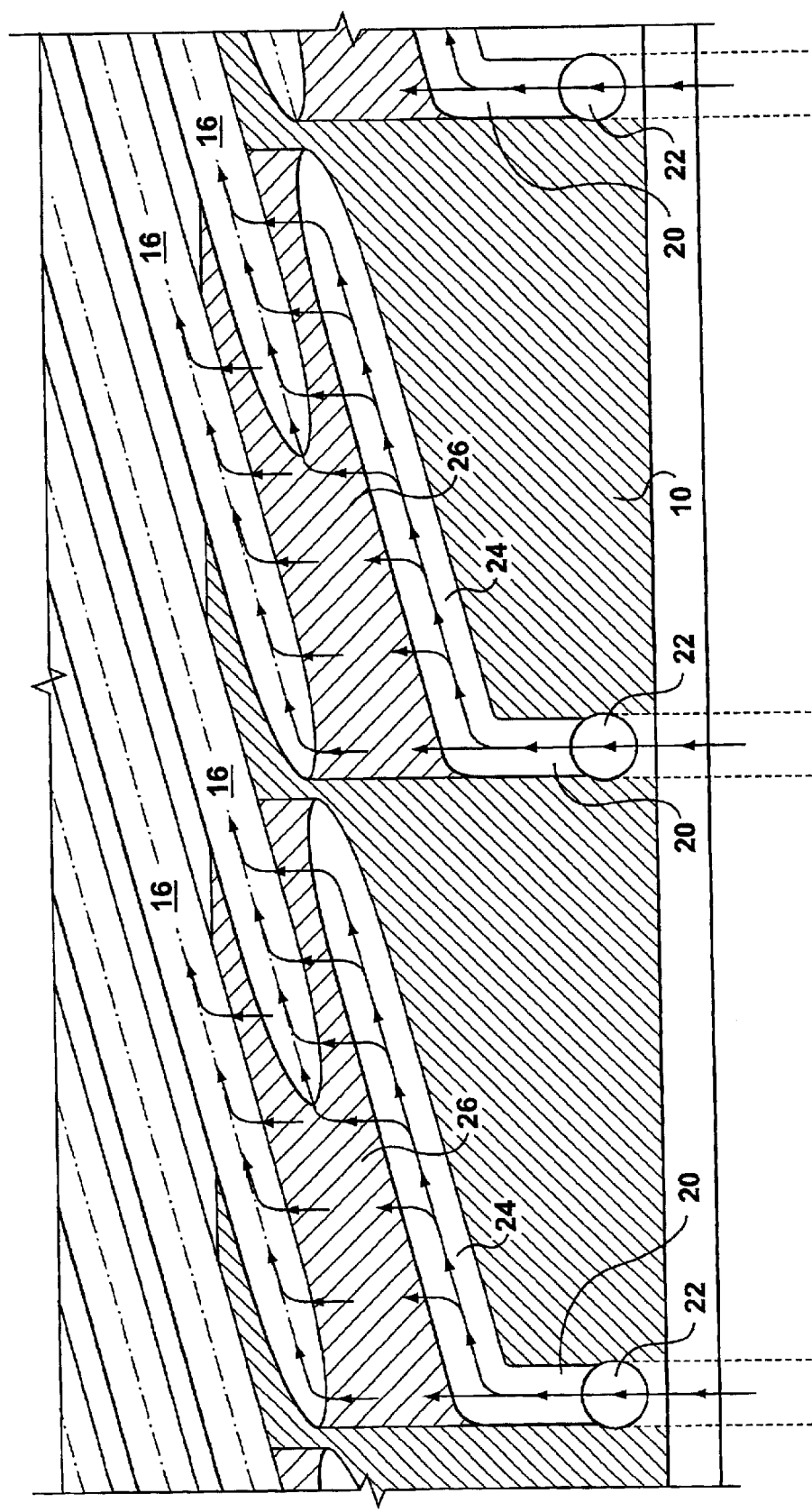
FIG. 5 is a similar view showing another embodiment.
Figure 6:
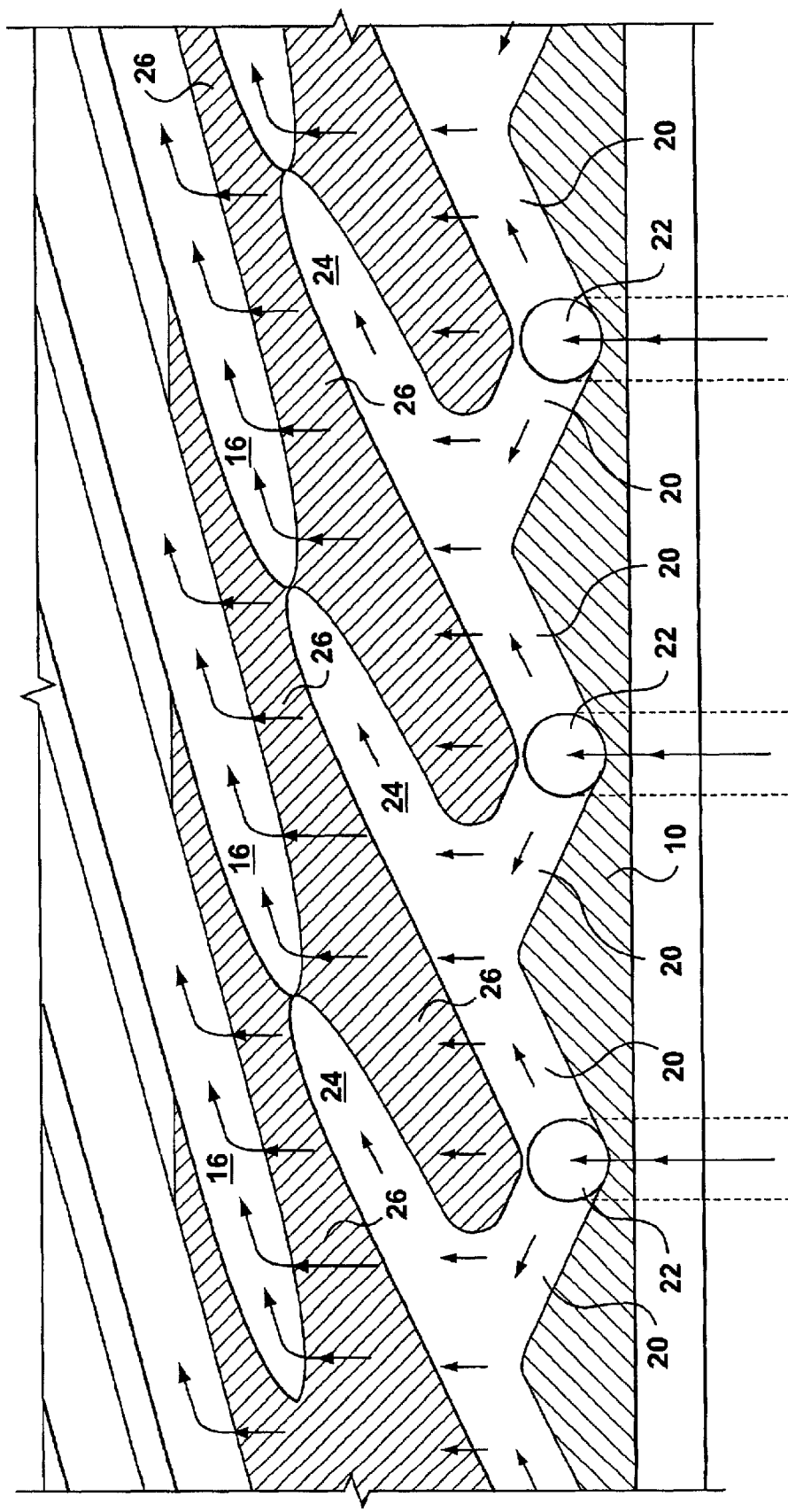
FIG. 6 is a similar view showing another embodiment.

FIG. 5 is similar to FIG. 6 but shows another embodiment in which the end portion 24 of each supply groove 20 is adjacent the initial portions of two main spiral feed grooves 16, so that plastic material from the end portion 24 flows partly to one main feed groove 16 and partly to an adjacent feed groove 16. This arrangement enables more space to be provided between the ports 22, thus enabling the provision of larger port holes for chilled air to be supplied to the interior of an extruded film bubble for internal bubble cooling.

FIG. 6 shows another embodiment in which port 22 feeds two supply grooves 20, and two supply grooves 20 from two adjacent ports 22 molds to form a single end portion 24.

Figure 7:
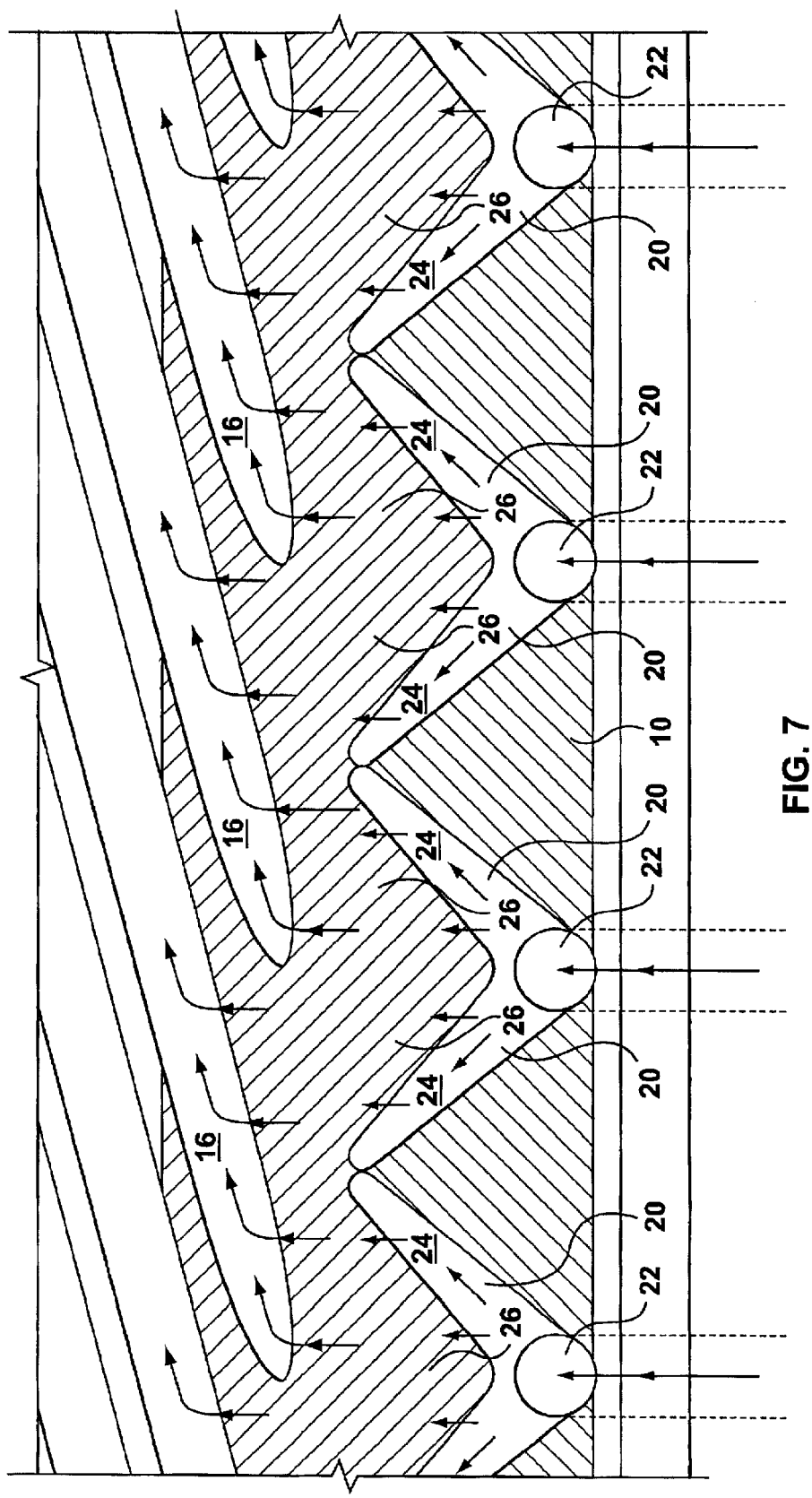
FIG. 7 is a similar view showing another embodiment.

FIG. 7 shows an embodiment in which each port 22 feeds to relatively short supply grooves 20 whose end portions 24 taper from the ports 22 towards their ends remote therefrom and which extend in directions which are substantially at right angles to each other. Two adjacent end portions 24 receiving plastic material from two adjacent ports 22 to feed the same initial portion of a main spiral feed through 16.

Figure 8:
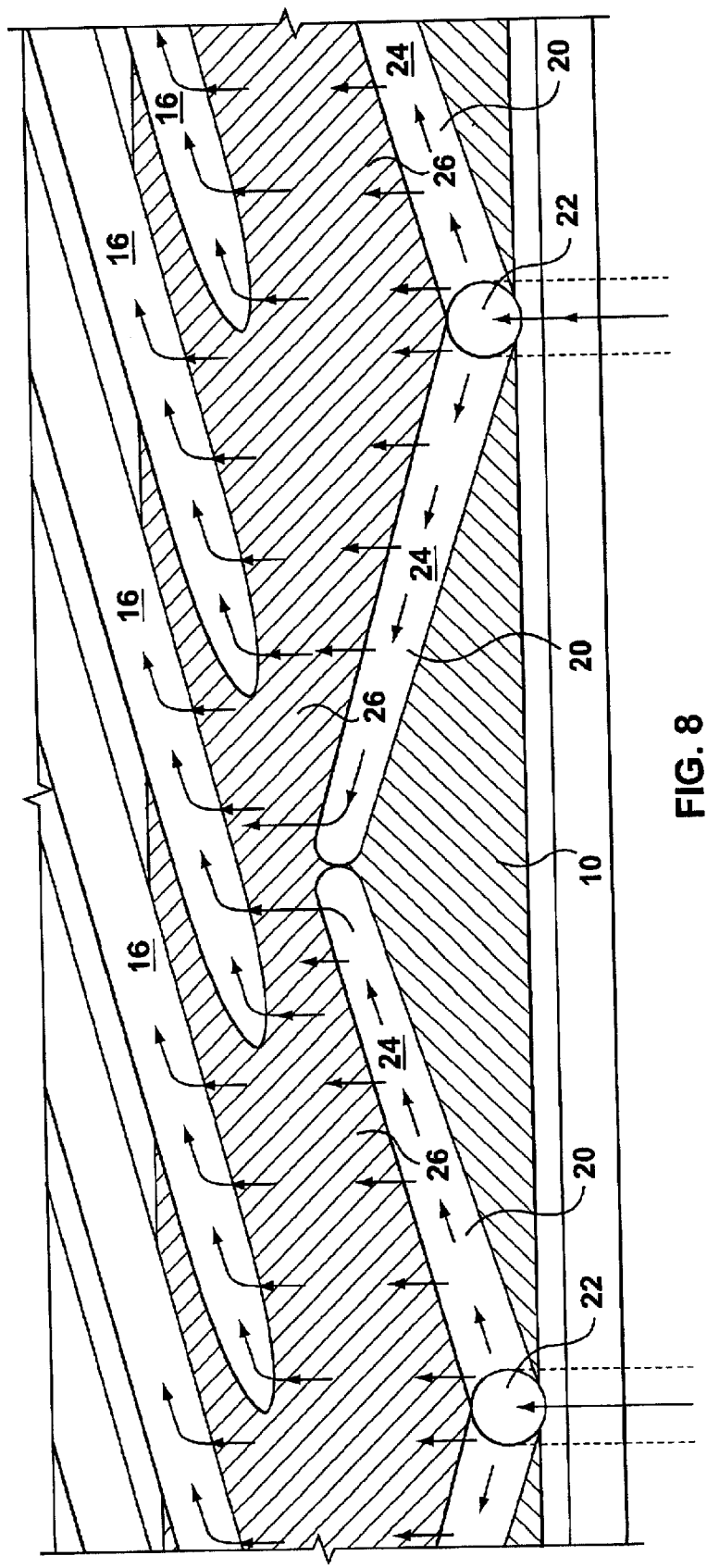
FIG. 8 is a similar view showing another embodiment.

FIG. 8 shown an embodiment which is somewhat similar to FIG. 7, but the supply grooves 20 are longer and more obliquely inclined towards each other such that each end portion 24 feed more of an initial portion of one main spiral feed groove 16 than the other.

Figure 9:
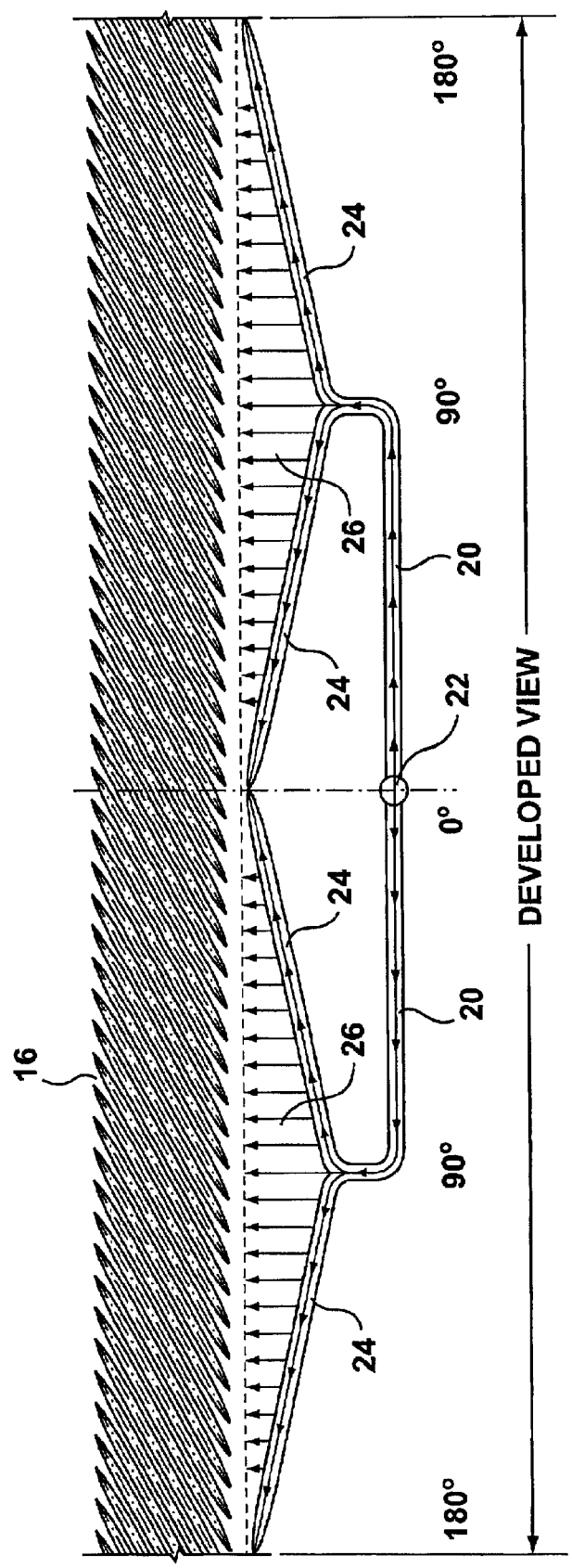
FIG. 9 is a similar view showing another embodiment.

FIG. 9 is a developed view of an inner body member showing the complete circumference. A single port 22 feeds two oppositely directed supply grooves 20, each of which in turn feeds two oppositely directed end portions 24. Each end portion 24 feeds a number of short main spiral feed grooves 16.

Figure 10:
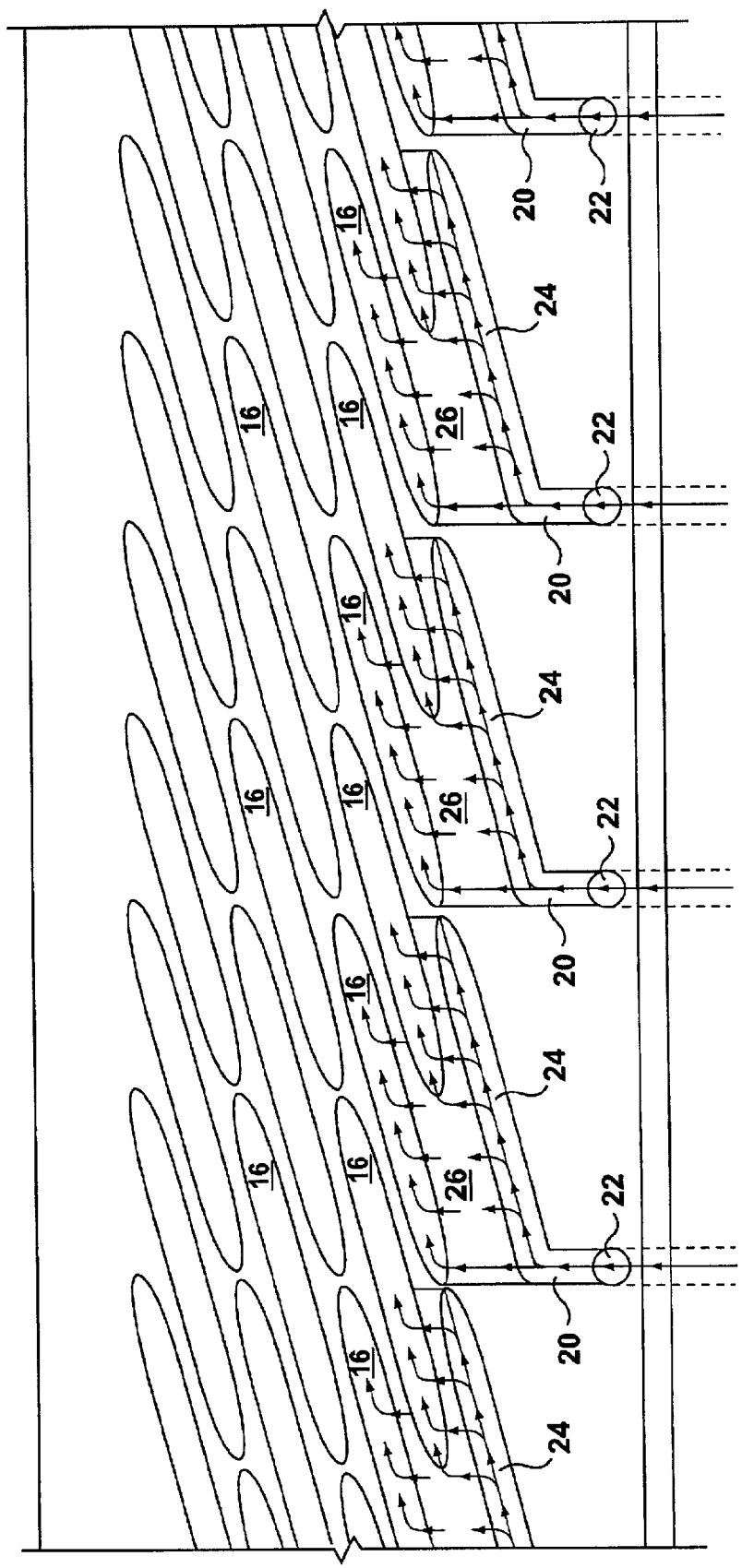
FIG. 10 is a similar view showing another embodiment.

FIG. 10 is similar to FIG. 3, except that each main spiral feed groove 16 is relatively short so that the plastic material travels along the annular passage from one groove 16 to another.

FIGS. 11 to 16 show embodiments in which the second body member is mounted above the first body member and their mutually engaging surfaces extend horizontally instead of substantially vertically as in the previous embodiments.

Figure 11:
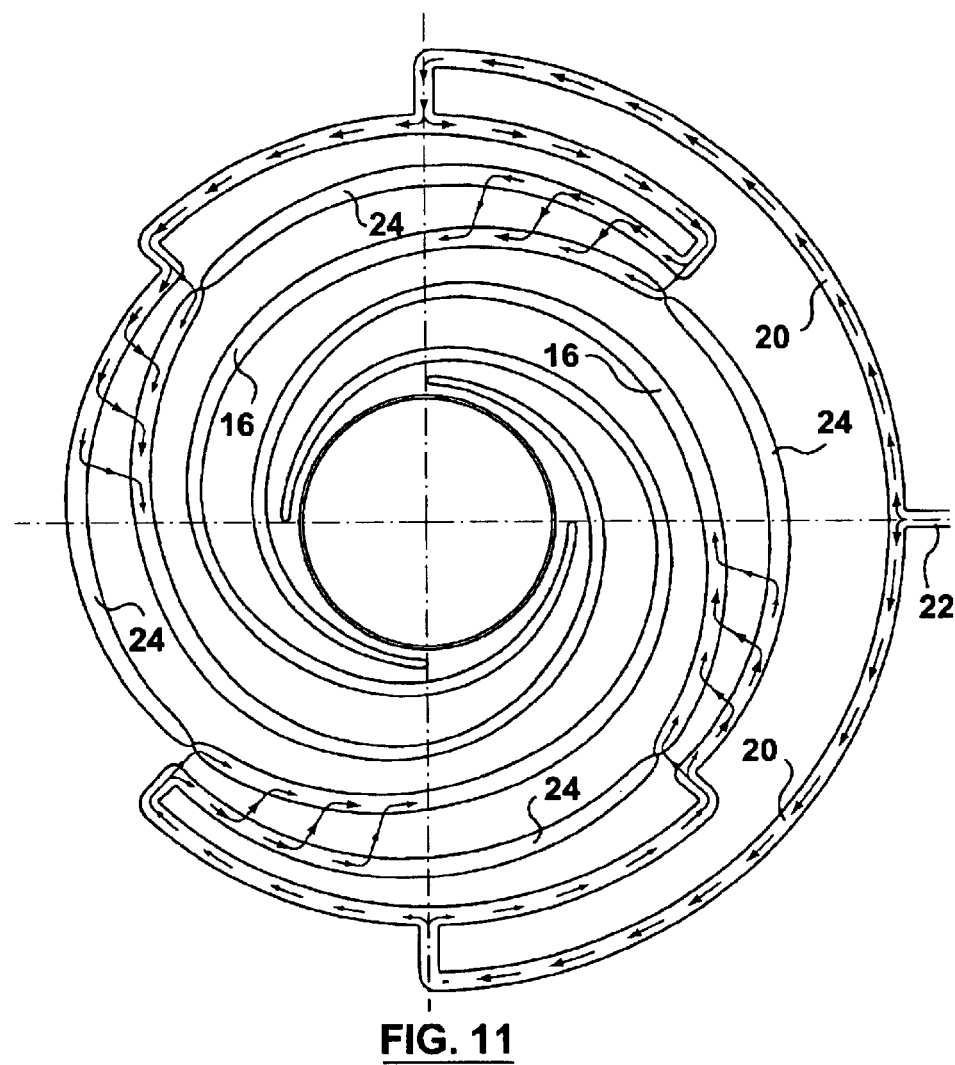
FIG. 11 is a diagrammatic plan view showing the supply grooves and main feed grooves in a first body member of an extrusion die in accordance with another embodiment of the invention.
Figure 12:
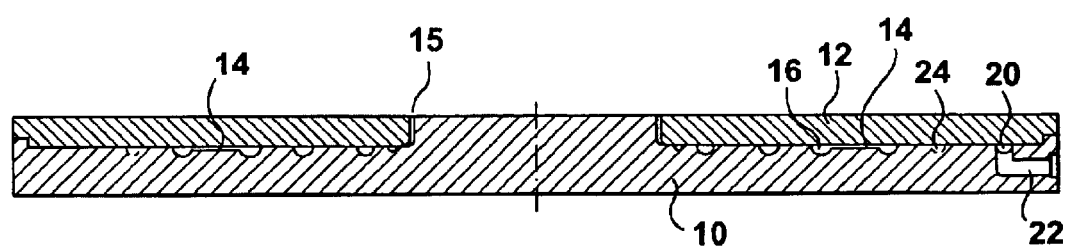
FIG. 12 is a sectional view of an extrusion die having the groove arrangement shown in FIG. 11, FIGS. 13 and 14 are similar to FIGS. 11 and 12 but show a further embodiment.

In the embodiment shown in FIGS. 11 and 12, there is a single port 20 which feeds two oppositely directed supply grooves 20, which each feed to two end portions 24. Each end portion 24 feeds to a different main spiral feed groove 16.

Figure 13:
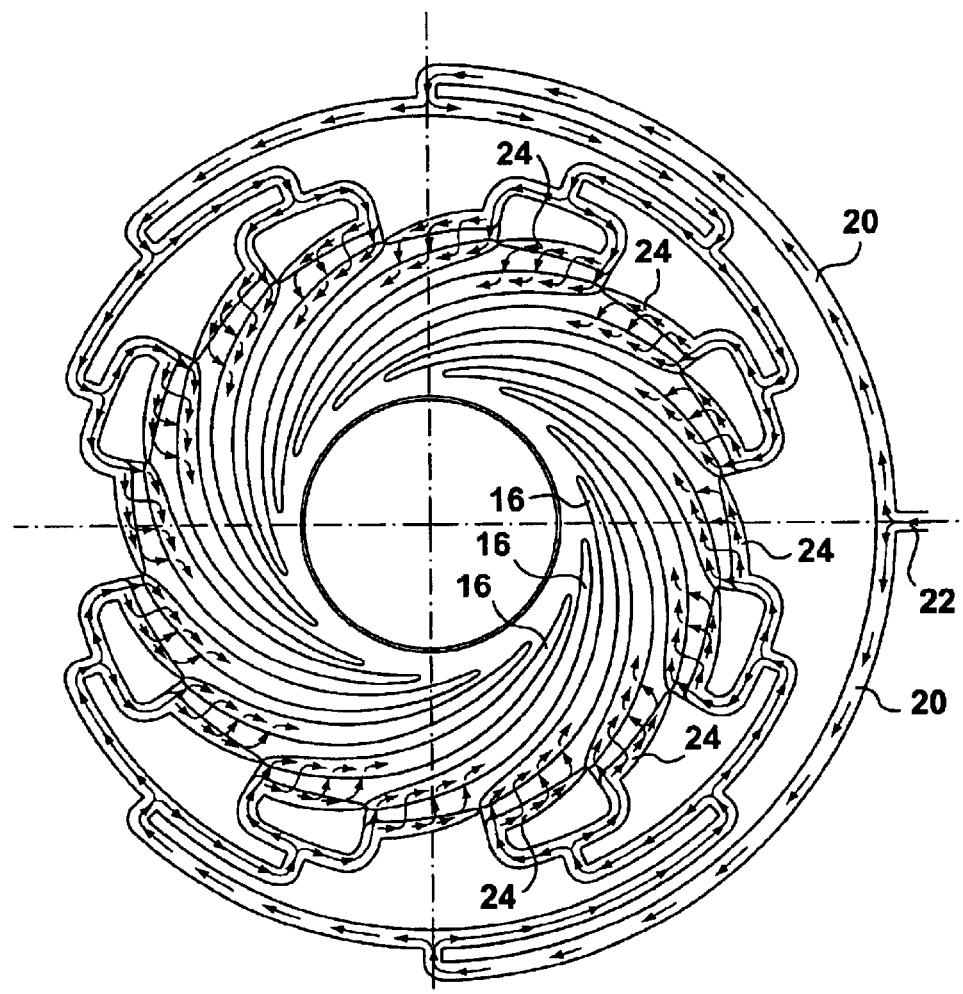
Figure 14:
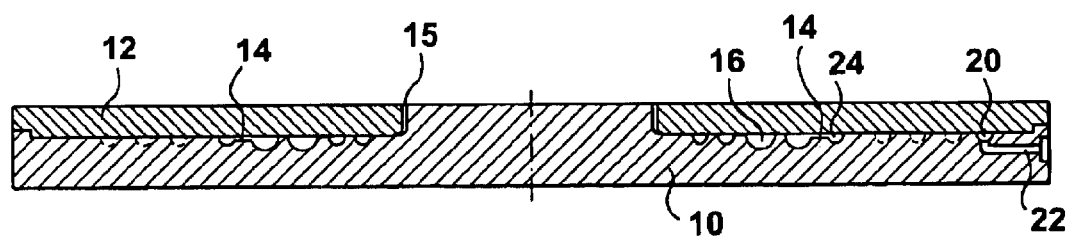

In the embodiment shown in FIGS. 13 and 14, there is a single port 22 which feeds to two oppositely directed supply grooves which each have a number of bifurcations so that a series of relatively short end portions 24 are produced, with each end portion 24 feeding to a different main spiral feed groove 16. It will be noted that the main spiral feed grooves 16 are shorter in circumferential extent than those of the previous embodiment.

Figure 15:
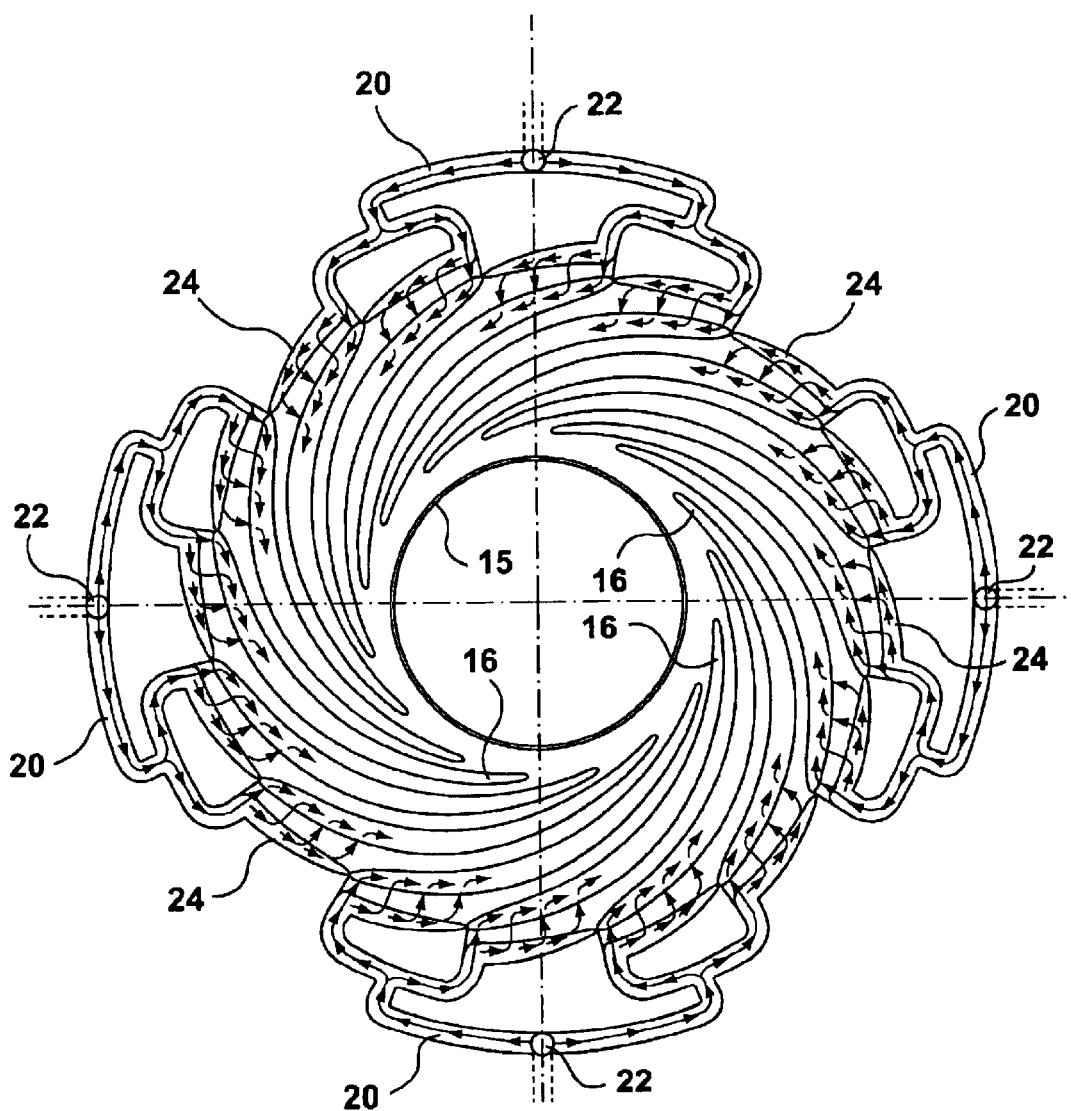
FIGS. 15 and 16 are similar to FIGS. 11 and 12 but show a still further embodiment.
Figure 16:
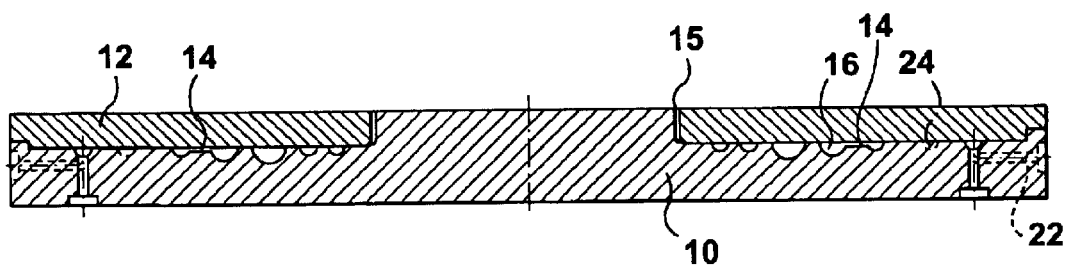

The embodiment shown in FIGS. 15 and 16 has four equi-angularly spaced ports 22 and a correspondingly adjusted arrangement of supply grooves 20 and end portions 24 thereof. The resemblance to FIG. 3 will be noted.

Figure 17:
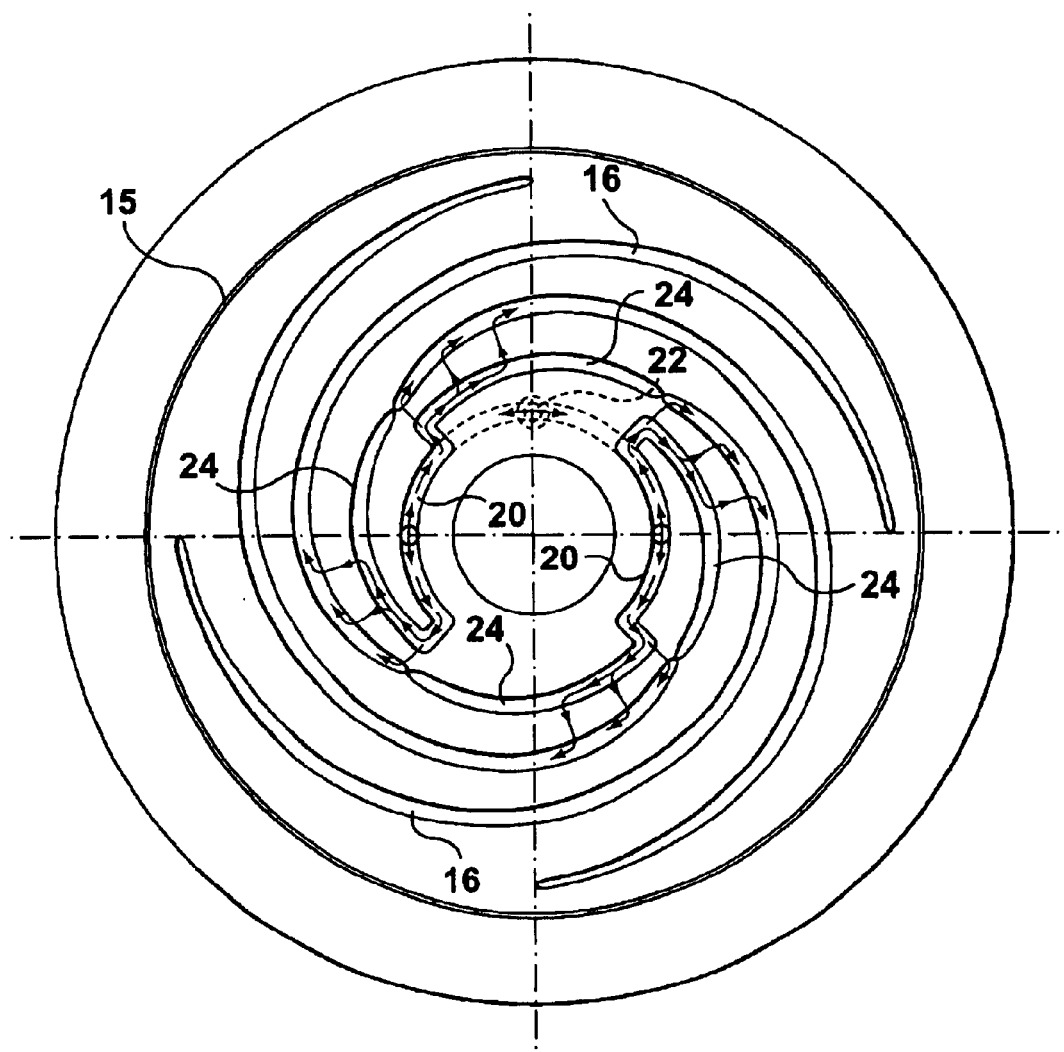
FIGS. 17 and 18 are similar to FIGS. 11 and 12 but show yet another embodiment.
Figure 18:
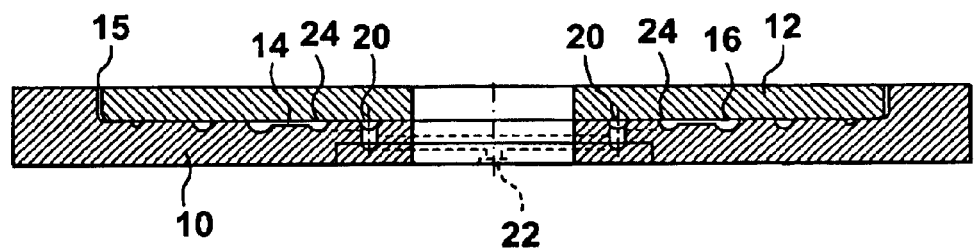

In the embodiment shown in FIGS. 17 and 18, a substantially central single port 22 feeds two supply grooves 20, the annular passage 15 being radially outermost instead of innermost as in the embodiments of FIGS. 11 to 16.

Figure 19:
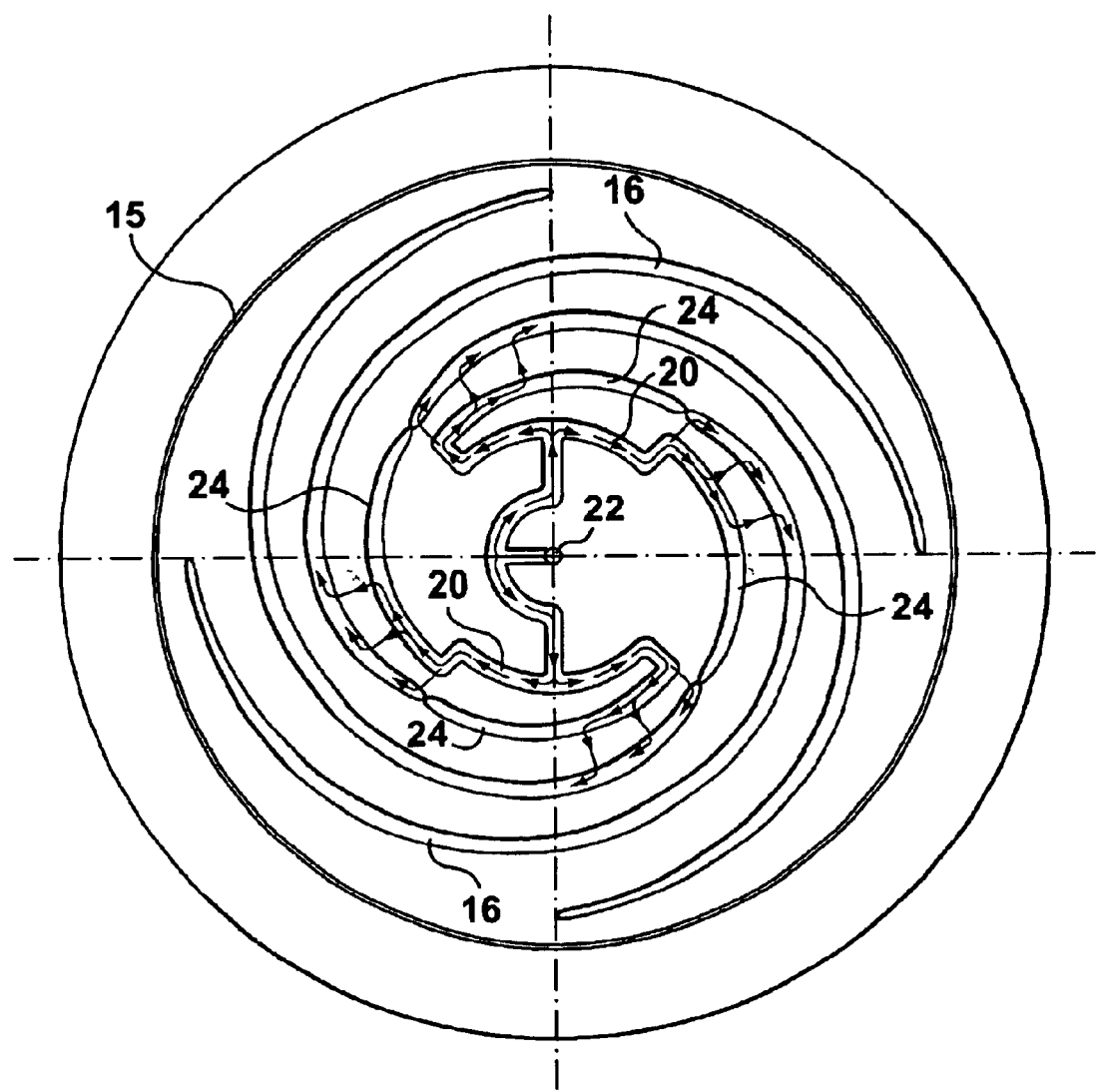
FIGS. 19 and 20 are similar to FIGS. 11 and 12 but show another embodiment.
Figure 20:
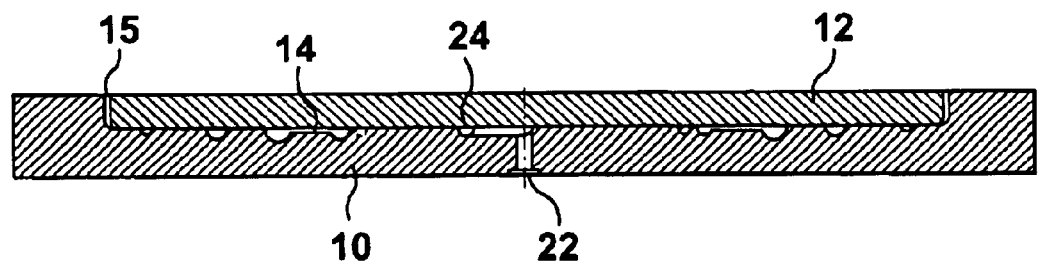

In the embodiment of FIGS. 19 and 20, the single port 22 is central and the annular extrusion orifice 15 is again outermost.

The foregoing description of various embodiments will enable a person skilled in the art to readily understand the invention and the advantages thereof. In particular it will be noted that the mutually engaging surfaces of the first and second body members may be substantially vertical or horizontal or at some inclined angle therebetween. The scope of the invention is defined in the appended claims.

What is claimed is:

1. An extrusion die for extruding plastic material as a tubular film having mutually engaging first and second body members which form an annular extrusion orifice therebetween,
    one of the body members having main feed grooves in a surface thereof adjacent the other body member and extending in a spiral manner relative to the annular extrusion orifice, and
    one of the body members having supply grooves in a surface thereof adjacent the other body member for receiving plastic material from one or more extruders, each supply groove having an end portion adjacent but spaced from an initial portion of a main feed groove, whereby plastic material from the extruder or extruders is received by the supply grooves and forced from the end portions thereof along a passage between the body members and into the initial portions of the spiral feed grooves.

2. An extrusion die according to claim 1 wherein each supply groove end portion feeds plastic material into a different single main feed groove.

3. An extrusion die according to claim 2 wherein each adjacent pair of supply grooves receives plastic material from a different single port.

4. An extrusion die according to claim 2 wherein each supply groove receives plastic material from a different single port.

5. An extrusion die according to claim 1 wherein each supply groove end portion feeds plastic material into two main feed grooves.

6. An extrusion die according to claim 5 wherein each supply groove receives plastic material from a single port.

7. An extrusion die according to claim 1 wherein each supply groove receives plastic material from two adjacent ports.

8. An extrusion die according to claim 1 having a series of ports receiving plastic material from the one or more extruders and wherein each port feeds plastic material to two supply grooves.

9. An extrusion die according to claim 1 wherein each main feed groove receives plastic material from two supply grooves.

10. An extrusion die according to claim 1 wherein each supply groove end portion feeds a series of main feed grooves.

11. An extrusion die according to claim 1 wherein the first and second body members are inner and outer body members and the supply grooves are at a lower end of the inner body member.

12. An extrusion die according to claim 1 wherein the second body member is mounted above the first body member.

13. An extrusion die according to claim 12 wherein the annular orifice is located centrally and is surrounded by the main feed grooves.

14. An extrusion die according to claim 12 wherein the annular extrusion orifice is located radially outwardly of the main feed grooves.

* * * * *